Nov. 1, 1955

J. J. PHILLIPS 2,722,437

FLEXIBLE HOSE FITTING

Filed Jan. 6, 1953

INVENTOR.
JOHN J. PHILLIPS

BY Emery, Varney,
Whittemore & Dix

ATTORNEYS

United States Patent Office 2,722,437
Patented Nov. 1, 1955

2,722,437

FLEXIBLE HOSE FITTING

John J. Phillips, West Orange, N. J., assignor to Titeflex, Inc., Newark, N. J., a corporation of Massachusetts Application January 6, 1953, Serial No. 329,851

9 Claims. (Cl. 285—72)

This invention relates to fittings for flexible metal hose, also known as flexible tubing, and more particularly to coupling fittings for flexible metal hose which comprises a convoluted or corrugated metal tube having a braided covering of wires or metal strips.

It is an object of the invention to provide an improved coupling fitting for flexible metal hose. It is a further object of the invention to provide a coupling fitting in which the danger of failure of the connection between the hose and the fitting under either high internal pressure or longitudinal stress is minimized. It also is an object of the invention to provide a coupling fitting suitable for use at high temperatures where a simple soldered connection might fail due to the melting of the solder. Another object of the invention is to provide a coupling fitting in which the end of the braided covering is firmly gripped and held by the coupling mechanically as well as by a soldered or welded connection. Other objects and advantages of the invention will appear hereinafter.

During the past few years flexible metal hose has been increasingly used in fuel and oil lines in jet air-craft. These lines, subjected to considerable vibration in service, also may be subjected to high temperatures and to high internal pressures, as well as to longitudinal tension. Conventional coupling fittings for flexible metal hose have not proved entirely satisfactory under these and similar strenuous conditions of service and the demand for a higher factor of safety, particularly when used in aircraft, has emphasized the need for improved coupling fittings.

Figure 1:
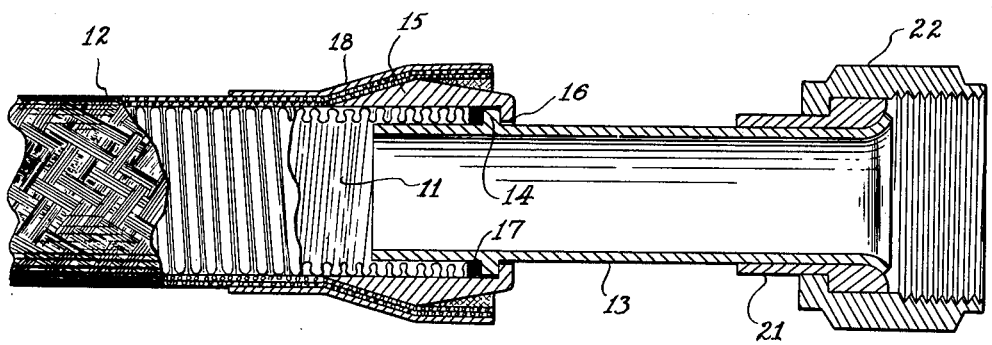
Figure 2:
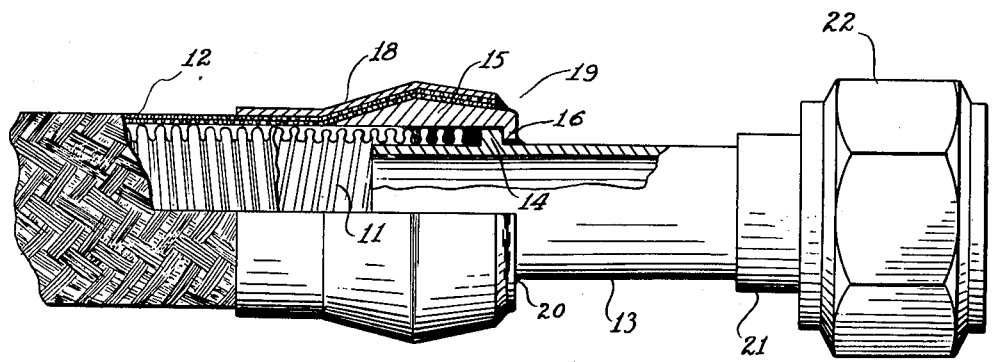

In the accompanying drawings illustrating a preferred embodiment of my invention:

Figure 1 is a longitudinal sectional view through the end of a flexible metal hose and the parts of the coupling fitting partially assembled on the end thereof; and Figure 2 is a view partly in side elevation and partly in longitudinal section showing the coupling fitting completely assembled on the end of the flexible metal hose.

As shown in the drawings, the flexible metal hose to which the fitting is to be attached comprises a convoluted metal tube 11 and a reinforcing and protective covering 12. The convoluted tube 11 may be made from a profiled strip of metal helically wound into tube form with the overlapping edges of the strip locked together in a continuous seam, for example in accordance with the teaching of the Louis H. Brinkman Patent 1,198,392, or it may be of the seamless type. It will be understood that the tube 11 also might be a corrugated tube, and the expression convoluted will be used herein as applying generically to such tubes as well. The covering 12 is shown as a basket woven casing of fine wires, but it will be understood that it might be a tubular braid of flat narrow metal strips. The braided wire covering 12, whether made of fine wires or of flat narrow strips, reinforces the metal tube 11 against internal pressures which tend to expand the tube radially and longitudinally, and also serves as a protective covering for the tube.

The coupling fitting comprises a rigid coupling tube 13 of external diameter such that it can be telescoped into the end of the convoluted tube 11. On the outer surface of the coupling tube, spaced a short distance from the end which enters the convoluted tube, is a stop flange 14 which limits the extent to which the coupling tube can be inserted into the convoluted tube. Preferably this stop flange 14 extends circumferentially around the coupling tube and its height is equal to the radial dimension of the wall of the convoluted tube.

Telescoped over the end of the convoluted tube 11 and under the braided wire covering 12 is a ferrule 15 which tapers downwardly in both directions from a point intermediate its ends, preferably approximately the mid-point. The outer end of the ferrule 15 is provided with an internal flange 16, preferably extending circumferentially of the ferrule, which engages the flange 14 on the coupling tube 13 to hold the latter against withdrawal from the convoluted tube 11.

Desirably the coupling tube 13 will be soldered to the end of the convoluted tube 11 in the finished assembly, and this may be accomplished by sliding a solder ring 17 onto the end of the coupling tube, against the flange 14, before the coupling tube is inserted into the convoluted tube 11. Application of heat to the coupling members after they have been assembled on the end of the flexible metal hose will cause the solder ring 17 to melt and unite the parts, effecting a fluid-tight seal between the end of the convoluted tube and the coupling tube.

Prior to inserting the coupling tube 13 into the end of the convoluted tube 11 a flared collar 18 is slipped onto the end of the flexible metal hose, over the braided covering 12. One end portion of this collar, preferably extending about one-third of its length, has a sliding fit on the flexible metal hose. The flaring portion of the collar preferably extends for about another third of the length of the collar and the remaining third may be of uniform diameter corresponding to the larger end of the flared portion. The collar 18 is positioned so that its larger end is approximately flush with the end of the flexible metal hose, and the smaller end of the collar then is swedged down tight against the braided wire covering 12. In commercial production a plurality of these collars may be slipped onto a long length of flexible metal hose and positioned therealong to provide the proper cut off lengths. The smaller ends of the collars then are swedged down on the braided wire covering and the hose is cut off flush with the larger ends of the collars.

The coupling tube 13, having the solder ring 17 and solder flux thereon, then is telescoped into the end of the convoluted tube 11 until the flange 14 presses the solder ring against the end of the convoluted tube. The ferrule 15, previously positioned on the coupling tube, is pushed onto the end of the convoluted tube and under the braided wire covering until further movement is stopped by engagement of the flange 16 with the flange 14, which is the condition shown in Figure 1. At this stage the braided wire covering 12 will be pressed outwardly by the tapered ferrule substantially into engagement with the flared intermediate portion of the collar 18. The flared portion of the collar and the extension from the larger end thereof then are swedged down tight onto the braided covering of the hose, substantially as shown in Figure 2. After this swedging operation the assembly is locally heated in the vicinity of the solder ring, which solders the coupling tube to the convoluted tube to effect a seal, and also unites these parts with the ferrule by solder.

Either high pressure within the flexible metal hose, or tension on the hose will increase the pressure applied by the swedged collar against the tapered ferrule, and the end of the braided covering 12 will be gripped firmly between the collar and the ferrule, relieving the stress on the soldered connection. Since the braided covering carries 90% or more of the load on a flexible hose assembly, failure of the line due to an inadequate solder connection is eliminated.

As an additional safety factor the end of the braided covering 12 may be connected to the swedged collar 18 and to the tapered ferrule 15 by a fused metal connection, by soldering or welding as shown at 19. The seal between the coupling tube and the end of the hose may be further reinforced by soldering or welding the coupling tube to the flange 16 of the ferrule 15, as shown at 20.

It will be evident that the end of the flexible metal hose is sealed fluid tight to the coupling tube 13 and that the braided covering 12 is securely attached to the coupling fitting so that a minimum of stress is applied to the soldered sealing connection. The fact that the collar 18 extends back along the hose beyond the end of the tapered ferrule distributes the stress and reduces danger of failure of the hose at the connection to the fitting.

The outer end of the rigid coupling tube is provided with suitable means for effecting a connection to the desired apparatus. In the illustrative embodiment an externally flanged ferrule 21 and an internally flanged connecting nut 22 are shown. After assembling these parts on the coupling tube the outer end of the coupling tube is flared outwardly and this holds the parts in assembled relation.

It will be understood that the invention herein disclosed may be variously modified and embodied within the scope of the subjoined claims.

I claim:

1. In combination with flexible hose having a convoluted metal tube and a braided wire covering, a fitting comprising a rigid coupling tube telescoped into the end of the convoluted tube, the coupling tube having an external circumferential flange intermediate its ends to limit the extent to which the coupling tube can be inserted into the convoluted tube, a ferrule tapered downwardly in both directions from a mid-point telescoped over the end of the convoluted tube and under the end of the braided covering, the outer end of the ferrule having an internal circumferential flange which engages the external flange on the coupling tube and prevents withdrawal of the latter from the convoluted tube, and a collar overlying the braided covering and extending from a point adjacent the flanged end of the ferrule longitudinally along and beyond the ferrule onto the flexible hose back of the ferrule, said collar being swedged down onto the braided covering over the tapered ferrule and, beyond the ferrule, over the convoluted tube.

2. The combination set forth in claim 1, which includes a solder ring between the end of the convoluted tube and the external circumferential flange on the coupling tube.

3. In combination with flexible hose having a convoluted metal tube and a braided wire covering, a fitting comprising a rigid coupling tube telescoped into the end of the convoluted tube, a ferrule tapered downwardly in both directions from a point intermediate its ends telescoped over the end of the convoluted tube and under the end of the braided covering, the ferrule and the coupling tube having interengaging flange portions whereby the ferrule prevents withdrawal of the coupling tube from the convoluted tube, and a collar overlying the braided covering and extending from a point adjacent the outer end of the ferrule longitudinally along and beyond the ferrule onto the flexible hose back of the ferrule, said collar being swedged down onto the braided covering over the ferrule and, beyond the ferrule, over the convoluted tube.

4. The combination set forth in claim 3, in which the end of the convoluted tube is sealed to the coupling tube by a soldered connection.

5. The combination set forth in claim 3, in which the coupling tube, the convoluted tube, and the tapered ferrule all are soldered together.

6. The combination set forth in claim 3, in which the outer end of the swedged collar is connected to the end of the braid and to the ferrule by a fused metal connection.

7. The combination set forth in claim 3, in which the collar extends back along the flexible hose beyond the ferrule a distance equal approximately to one-half the length of the ferrule.

8. The combination set forth in claim 3, in which the flange on the ferrule is sealed to the coupling tube by a fused metal connection.

9. The method of attaching a coupling fitting to flexible metal hose having a convoluted metal tube and a braided wire covering, which includes the steps of sliding a cylindrical metal collar having an outwardly flared portion onto the end of the flexible hose, swedging the unflared portion only of the collar onto the flexible hose, cutting off the tubing flush with the outwardly flared end of the collar, telescoping a rigid coupling tube having an external circumferential stop flange into the end of the convoluted tube until the stop flange engages the end thereof, telescoping a ferrule tapered downwardly in both directions from a point intermediate its ends over the end of the convoluted tube between the convoluted tube and the braid, and then swedging the flared portion of the collar down onto the braided covering overlying the ferrule.

References Cited in the file of this patent

UNITED STATES PATENTS

| 656,187 | Gunnell | Aug. 21, 1900 |
| 1,329,760 | Fulton | Feb. 3, 1920 |
| 1,886,275 | Nell | Nov. 1, 1932 |
| 2,002,121 | McMaster | May 21, 1935 |
| 2,158,538 | Gish | May 16, 1939 |
| 2,583,956 | Lindsay et al. | Jan. 29, 1952 |
| 2,610,869 | Allison | Sept. 16, 1952 |

FOREIGN PATENTS

| 2,210 | Great Britain | 1908 |